(12) United States Patent
Sazuka

(10) Patent No.: US 10,183,612 B2
(45) Date of Patent: Jan. 22, 2019

(54) VEHICLE LAMP HAVING ROTATABLE LAMP UNIT AND PROTRUSIONS AS FULCRUM

(71) Applicant: Koito Manufacturing Co., Ltd., Tokyo (JP)

(72) Inventor: Kiyoshi Sazuka, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 113 days.

(21) Appl. No.: 15/352,819

(22) Filed: Nov. 16, 2016

(65) Prior Publication Data

US 2017/0151901 A1   Jun. 1, 2017

(30) Foreign Application Priority Data

Nov. 30, 2015 (JP) ................... 2015-233402

(51) Int. Cl.
*B60Q 1/068* (2006.01)
*F21S 41/19* (2018.01)
(Continued)

(52) U.S. Cl.
CPC .......... *B60Q 1/0683* (2013.01); *F21S 41/147* (2018.01); *F21S 41/192* (2018.01); *F21S 41/255* (2018.01); *F21S 41/295* (2018.01); *F21S 41/321* (2018.01); *F21S 41/36* (2018.01); *F21S 41/39* (2018.01); *F21S 41/43* (2018.01); *F21S 45/47* (2018.01); *F21S 45/49* (2018.01); *B60Q 2200/36* (2013.01); *F21S 41/365* (2018.01)

(58) Field of Classification Search
CPC . B60Q 1/0683; B60Q 2200/36; F21S 41/147; F21S 41/192; F21S 41/295; F21S 41/36; F21S 41/255; F21S 41/321; F21S 41/43; F21S 41/39; F21S 41/365; F21S 45/43; F21S 45/47; F21S 45/49
See application file for complete search history.

(56) References Cited

U.S. PATENT DOCUMENTS

| | | | | |
|---|---|---|---|---|
| 6,089,737 A | * | 7/2000 | Ito ...................... | B60Q 1/0683 362/287 |
| 2011/0019409 A1 | * | 1/2011 | Wronski ............... | F21V 7/00 362/235 |
| 2011/0141752 A1 | * | 6/2011 | Nishitani ............. | B60Q 1/0683 362/460 |

FOREIGN PATENT DOCUMENTS

| JP | 2009-211966 A | | 9/2009 |
|---|---|---|---|
| JP | 2009211966 A | * | 9/2009 |

OTHER PUBLICATIONS

Abe, Vehicular Headlight, Sep. 17, 2009, Patent Pub JP2009211966 A; JPO and INPIT.*

* cited by examiner

*Primary Examiner* — Anh Mai
*Assistant Examiner* — Michael Chiang
(74) *Attorney, Agent, or Firm* — Abelman, Frayne & Schwab

(57) ABSTRACT

A lamp unit is fastened to a bracket via screw fastening at two positions in the vehicle width direction where a rotation axis Ax1 of the lamp unit extends. Then, the bracket includes protrusions formed at four positions in the direction where the rotation axis Ax1 extends to allow the lamp unit to be rotated in the vertical direction by being in contact with a support panel of the lamp unit. Accordingly, with a simplified configuration, the contact portions of the four protrusions may function as fulcrums when the lamp unit rotated, and the lamp unit may be rotated in the vertical direction.

9 Claims, 10 Drawing Sheets

(51) Int. Cl.
*F21S 41/147* (2018.01)
*F21S 41/29* (2018.01)
*F21S 41/255* (2018.01)
*F21S 41/39* (2018.01)
*F21S 41/32* (2018.01)
*F21S 41/36* (2018.01)
*F21S 41/43* (2018.01)
*F21S 45/49* (2018.01)
*F21S 45/47* (2018.01)
*F21S 41/365* (2018.01)

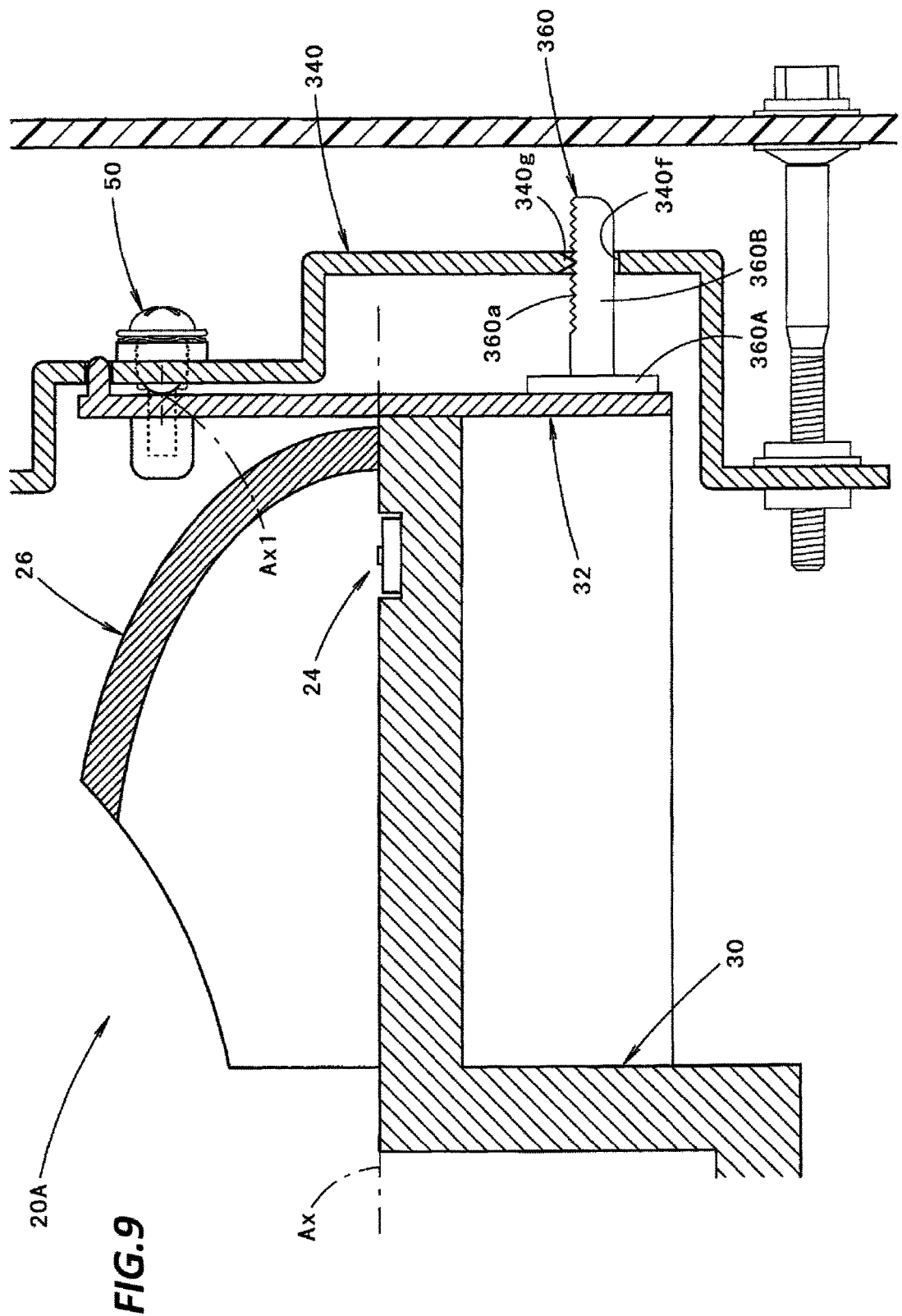

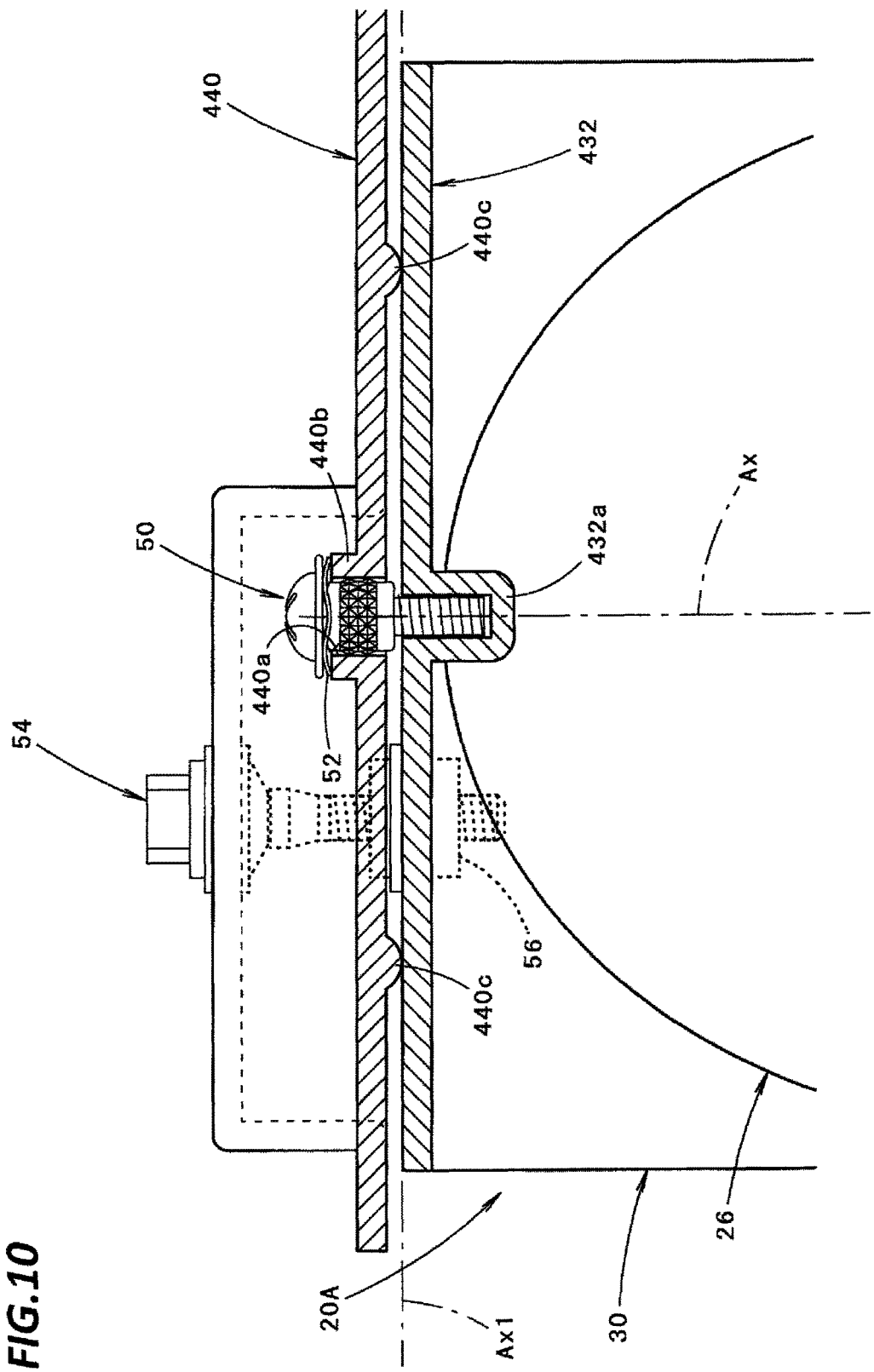

VEHICLE LAMP HAVING ROTATABLE LAMP UNIT AND PROTRUSIONS AS FULCRUM

CROSS-REFERENCE TO RELATED APPLICATIONS

This application is based on and claims priority from Japanese Patent Application No. 2015-233402, filed on Nov. 30, 2015, with the Japan Patent Office, the disclosure of which is incorporated herein in its entirety by reference.

TECHNICAL FIELD

The present disclosure relates to a vehicle lamp that includes a support member to support a lamp unit to be rotatable in a required direction.

BACKGROUND

Conventionally, a vehicle lamp is known which includes a lamp unit and a support member to support the lamp unit to be rotatable in a required direction.

As such a vehicle lamp, Japanese Patent Laid-Open Publication No. 2009-211966 discloses a vehicle lamp configured to adjust the optical axis of a lamp unit by rotating the lamp unit in a required direction by appropriately adjusting an optical axis adjustment bolt that connects the lamp unit and a support member to each other.

SUMMARY

In the vehicle lamp described in Japanese Patent Laid-Open Publication No. 2009-211966, a support structure of the lamp unit using the support member needs to be configured to have a fulcrum function that allows the lamp unit to be rotated by the adjustment of the optical axis adjustment bolt.

As the support structure having the fulcrum function, for example, a configuration in which a spherical step bearing and a pivot are combined may be considered. However, in this case, the support structure is complicated, and correspondingly, the cost of the lamp is increased.

The present disclosure has been made in consideration of the aforementioned situation, and an object of the present disclosure is to provide a vehicle lamp, which includes a support member to support a lamp unit to be rotatable in a required direction, thereby rotating the lamp unit in the required direction via a simplified configuration.

In order to achieve the above object, the present disclosure employs a configuration in which a predetermined protrusion is formed on a lamp unit or a support member.

That is, according to the present disclosure, a vehicle lamp includes a lamp unit, and a support member configured to support the lamp unit to be rotatable in a required direction. The lamp unit is fastened to the support member at at least one position in a direction where a rotation axis extends when the lamp unit is rotated in the required direction, and one of the lamp unit and the support member includes protrusions that are formed at at least two positions in the direction where the rotation axis extends, and configured to allow the lamp unit to be rotated in the required direction by being in contact with a remaining one of the lamp unit and the support member.

A concrete direction of "the required direction" is not particularly limited, and for example, a vertical direction or a horizontal direction may be employed.

The "support member" is not limited to a particular member so long as it is configured to support the lamp unit to be rotatable in the required direction. For example, a bracket supported on a lamp body or the lamp body itself may be employed.

A specific method to "fasten" the lamp unit to the support member is not particularly limited, and for example, screw fastening, press-fit, or lance engagement may be employed.

Each "protrusion" is not particularly limited in terms of, for example, a specific shape or a formed position so long as the protrusion allows the lamp unit to be rotated in the required direction.

The vehicle lamp according to the present disclosure may achieve the acting effects to be described below because the lamp unit supported to be rotatable in the required direction in relation to the support member is fastened to the support member at at least one position in the direction where the rotation axis extends, and one of the lamp unit and the support member includes protrusions that are formed at at least two positions in the direction where the rotation axis extends, and configured to allow the lamp unit to be rotated in the required direction by being in contact with a remaining one of the lamp unit and the support member.

That is, by forming the protrusions at at least two positions in the direction where the rotation axis extends, even with a simplified configuration in which the lamp unit is fastened to the support member at at least one position, the contact portions of the plural protrusions may function as fulcrums when the lamp unit is rotated, and accordingly, the lamp unit may be rotated in the required direction.

As described above, according to the present disclosure, in the vehicle lamp including the support member to support the lamp unit to be rotatable in the required direction, the lamp unit may be rotated in the required direction with a simplified configuration. Accordingly, the cost of the vehicle lamp can be reduced.

In the above configuration, when one of the lamp unit and the support member includes an insertion hole that is formed at at least one position in the direction where the rotation axis extends to insert a fastener therethrough, and the protrusions are respectively formed on the opposite sides of each insertion hole in the direction where the rotation axis extends, the repulsive force acting when fastening each fastener may be well balanced by the pair of protrusions located at opposite sides of each insertion hole.

In the above configuration, when each protrusion is formed as a substantially semi-spherical shape, or a substantially semi-cylindrical protrusion extending in the direction where the rotation axis extends, the contact portions of the plural protrusions may function as fulcrums when the lamp unit is rotated, and each protrusion may have a sufficient repulsive force support function when the fastener is fastened.

In the above configuration, when the fastener is configured as a screw, on which a washer is mounted, and the washer is elastically deformable in a direction where the corresponding fastener is fastened, even if the positional relationship between each screw and the lamp unit or the support member, which comes into contact with the respective protrusion, somewhat varies depending on the rotation of the lamp unit, the variation may be easily absorbed by the elastic deformation of the washer. Accordingly, it is possible to suppress an excessive force from being applied to the lamp unit or the support member.

For example, a wave washer or a spring washer may be employed as "the washer".

In the above configuration, when the support member is configured as a bracket supported to be rotatable in relation to a lamp body, and a plurality of lamp units is supported on the bracket, the following acting effects may be acquired.

That is, by configuring the support member as the bracket supported to be rotatable in relation to the lamp body, the optical axes of the lamp units can be adjusted at the same time. Therefore, a required rotating amount of each lamp unit in the required direction may be suppressed to a relatively small value for correcting a difference between the optical axes of the respective lamp units. Accordingly, each lamp unit in the required direction can be rotated more easily even with a simplified configuration.

In addition, when the vehicle lamp is configured to include the plurality of lamp units, each lamp unit may be relatively light in weight. Accordingly, each lamp unit can be easily rotated in the required direction even with a simplified configuration, and thus, the cost of the vehicle lamp may be further reduced.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 9 is approximately the same view as FIG. 2, illustrating a third modification of the exemplary embodiment.

FIG. 10 is the same view as FIG. 3, illustrating a fourth modification of the exemplary embodiment.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described with reference to the accompanying drawings.

Figure 1:
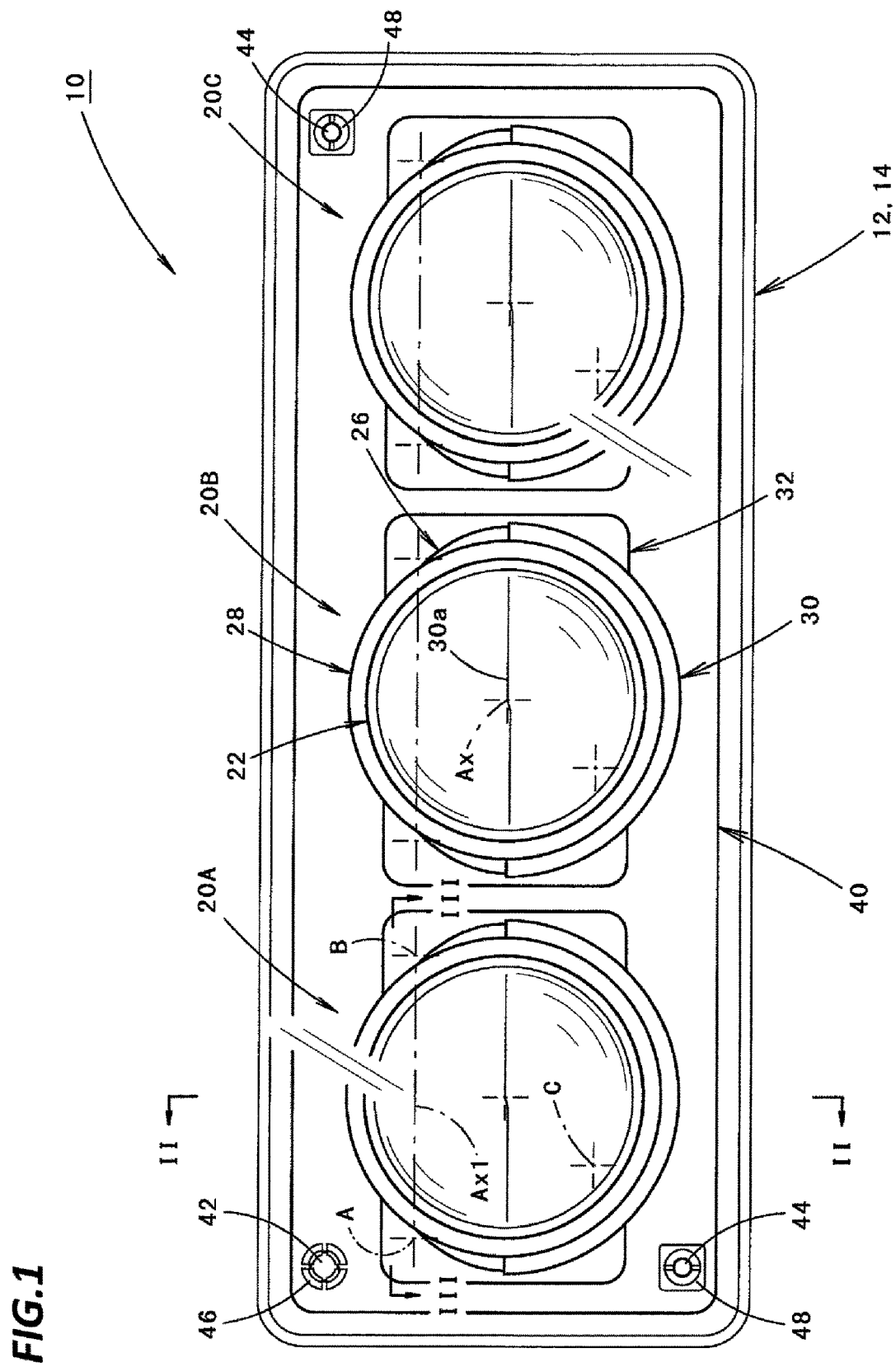
FIG. 1 is a front view illustrating a vehicle lamp according to an exemplary embodiment of the present disclosure.

FIG. 1 is a front view illustrating a vehicle lamp 10 according to an exemplary embodiment of the present disclosure.

As illustrated in FIG. 1, the vehicle lamp 10 according to the present exemplary embodiment is a headlamp for low beam irradiation, and has a configuration in which three (3) lamp units 20A, 20B, and 20C are accommodated side by side in the vehicle width direction within a lamp chamber that is formed by a lamp body 12 and a plain glass light-transmitting cover 14 attached to a front end opening of the lamp body 12.

The three lamp units 20A, 20B, and 20C are supported on the lamp body 12 via a common bracket 40.

In that event, each of the lamp units 20A, 20B, and 20C is supported to be rotatable in relation to the bracket 40 in the vertical direction about a rotation axis Ax1 that horizontally extends in the vehicle width direction.

In addition, the bracket 40 is supported to be rotatable in relation to the lamp body 12 in the vertical direction and the horizontal direction by a pivot 42 located at the right upper side to face the front side of the lamp (i.e., the left upper side when viewed from the front side of the lamp), and two aiming screws 44 located at the left upper side and the right lower side.

All the three lamp units 20A, 20B, and 20C are projector type lamp units. Although the three lamp units 20A, 20B, and 20C have different light distribution control aspects, the basic configurations thereof are the same.

Accordingly, hereinafter, a detailed configuration will be described concerning the lamp unit 20A located at the right end.

Figure 2:
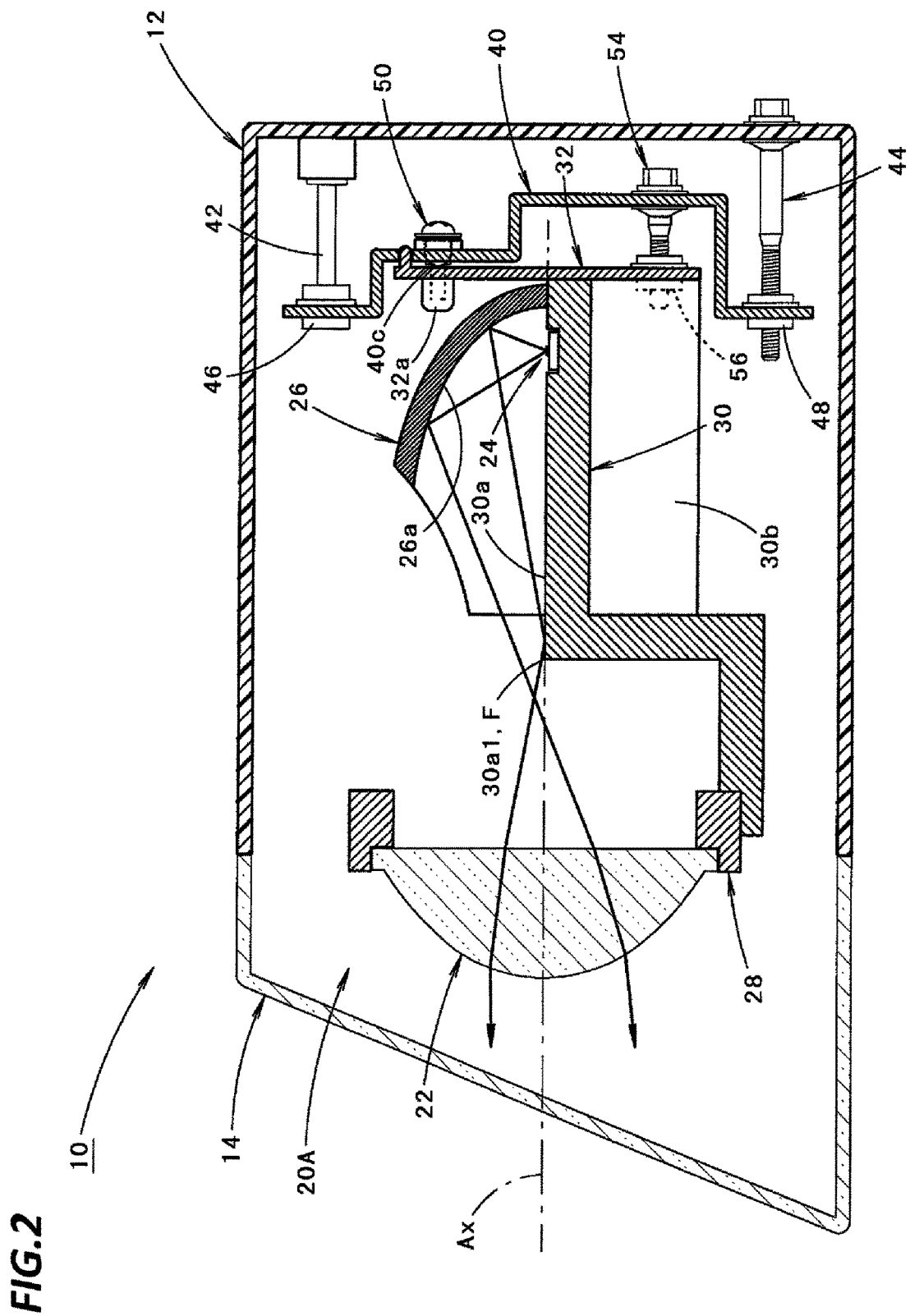
FIG. 2 is a sectional view taken along line II-II of FIG. 1.

FIG. 2 is a sectional view taken along line II-II of FIG. 1.

As illustrated in FIG. 2, the lamp unit 20A includes a projection lens 22 having an optical axis Ax that extends in the vehicle length direction, a light emitting element 24 as a light source located at the rear side of a rear side focal point F of the projection lens 22, and a reflector 26 located to cover the light emitting element 24 from the upper side thereof and configured to reflect light from the corresponding light emitting element 24 toward the projection lens 22.

The light emitting element 24 and the reflector 26 are supported on a base member 30, and the projection lens 22 is supported on the base member 30 via a lens holder 28.

The base member 30 is formed with an upward reflecting surface 30a that upwardly reflects some of light reflected from the reflector 26 to be incident on the projection lens 22 in order to from a cutoff line of a low beam light distribution pattern. The front-end edge 30a1 of the upward reflecting surface 30a is formed to extend from the rear side focal point F toward the left and right sides.

The base member 30 is formed with a plurality of radiation fins 30b on the bottom surface thereof. Accordingly, the base member 30 functions as a heat sink.

A support panel 32 is fixed to the rear-end surface of the base member 30 to extend along a vertical plane that is orthogonal to the optical axis Ax. The lamp unit 20A is supported on the bracket 40 at three positions of the support panel 32.

In addition, as illustrated in FIG. 2, the base end of the pivot 42 is fixed to the lamp body 12, and the tip end of the pivot 42 is engaged with a spherical step bearing 46 mounted on the bracket 40. In addition, the base end of the aiming screw 44 is rotatably supported on the lamp body 12, and an aiming nut 48 mounted on the bracket 40a is screwed onto the tip end of the aiming screw 44.

Figure 3:
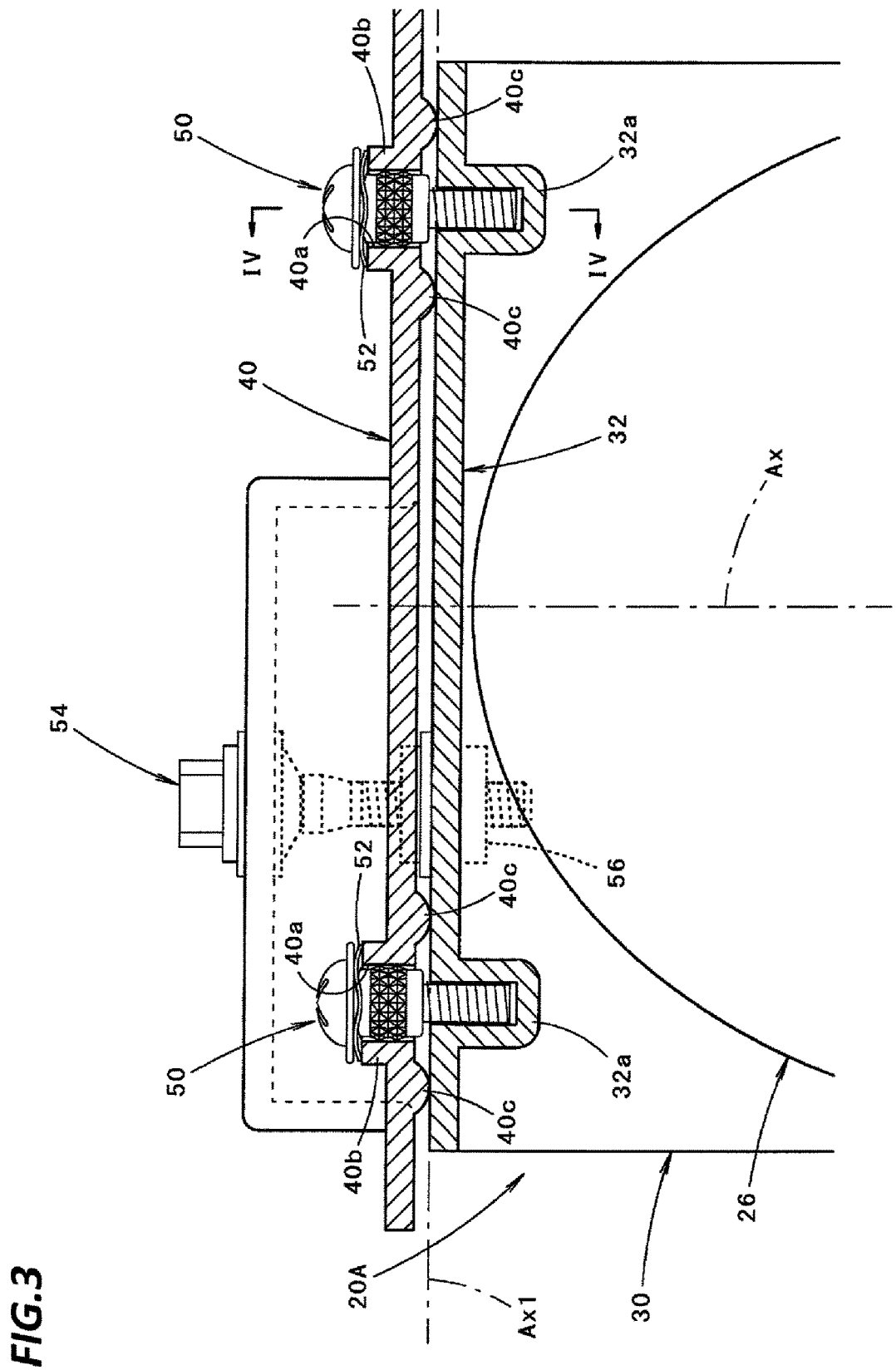
FIG. 3 is a sectional view taken along line III-III of FIG. 1.
Figure 4:
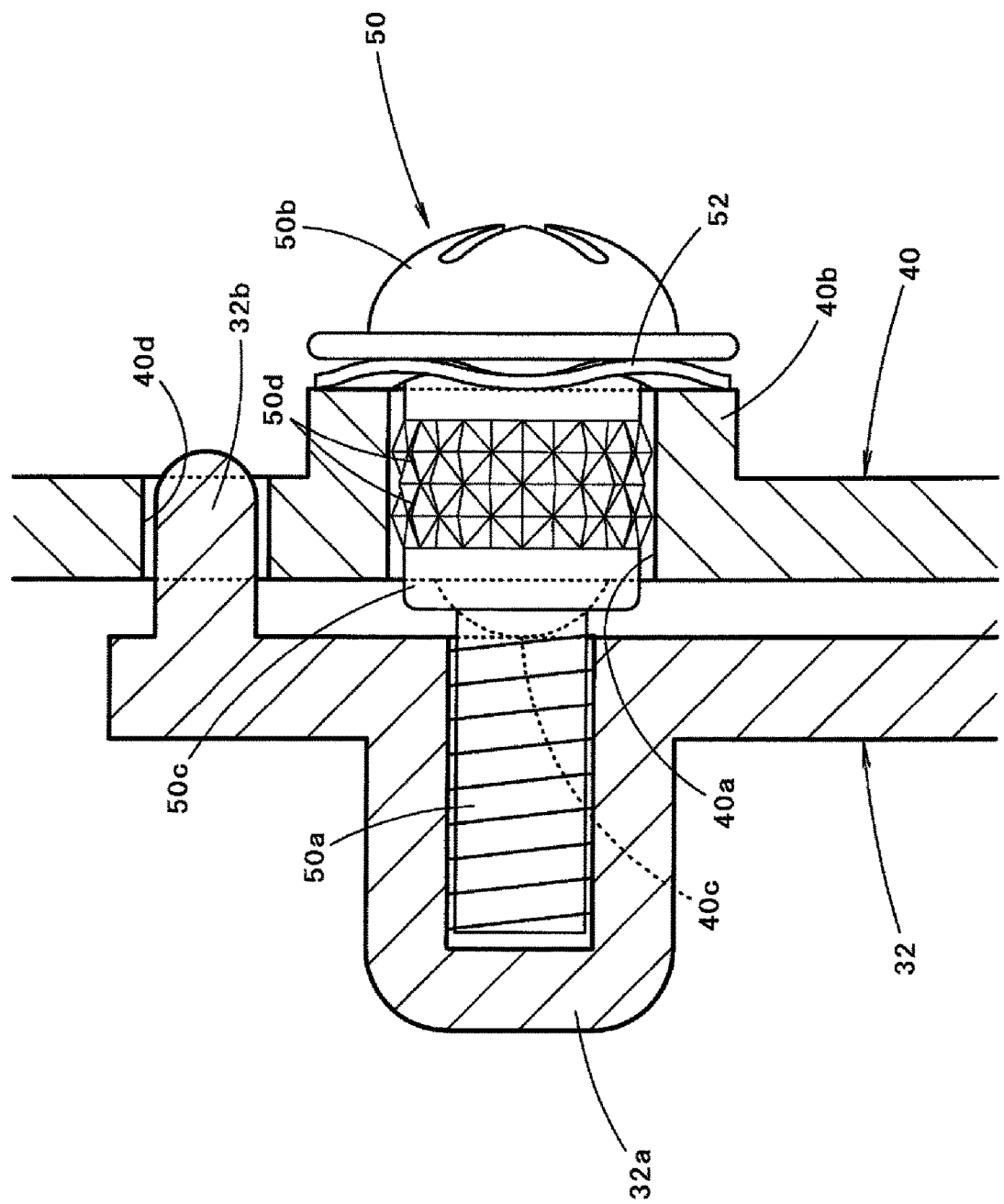
FIG. 4 is a sectional view taken along line IV-IV of FIG. 3.
Figure 5:
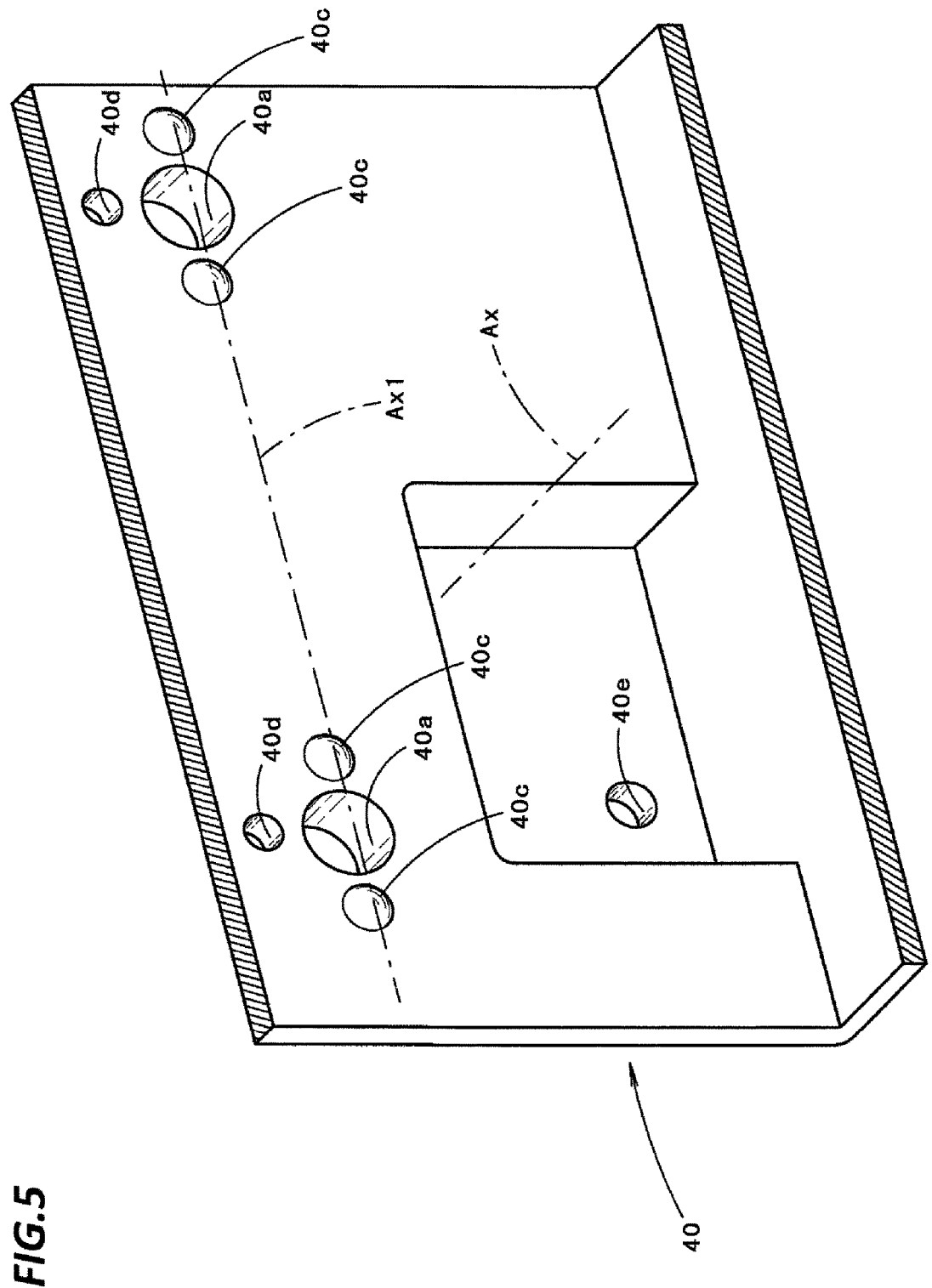
FIG. 5 is a perspective view illustrating a principal part of a bracket of the vehicle lamp.

FIG. 3 is a sectional view taken along line III-III of FIG. 1. In addition, FIG. 4 is a sectional view taken along line IV-IV of FIG. 3. In addition, FIG. 5 is a perspective view illustrating principal components of the bracket 40.

As illustrated in FIG. 3, the support panel 32 is fastened to the bracket 40 by screw fastening at two positions (designated by A and B in FIG. 1) above the optical axis Ax and in the direction where the rotation axis Ax1 extends.

A washer 52 is mounted on a screw 50 used for the screw fastening to be elastically deformable in the screw fastening direction of the screw 50. The washer 52 is configured as a wave washer having waveforms that are repeatedly formed around the entire periphery thereof.

As illustrated in FIG. 4, the screw 50 is configured as a stepped screw in which a portion between a screw portion 50a and a head portion 50b is configured as a large-diameter portion 50c having a larger diameter than the screw portion 50a. The large-diameter portion 50c of the screw 50 is provided with a plurality of wedge-shaped protrusions 50d in order to prevent separation of the washer 52 mounted on the corresponding large-diameter portion 50c.

As illustrated in FIG. 3, the bracket 40 is provided with sleeves 40b at two positions in the direction where the rotation axis Ax1 extends. The sleeves 40b are formed to protrude to the rear side from the bracket 40, and the inner diameter of the sleeves 40b is set to be slightly larger than the large-diameter portion 50c of the screw 50. In addition, an inner circumferential surface of the sleeve 40b forms an insertion hole 40a to insert the screw 50 therethrough.

In addition, the bracket 40 is provided, at four positions in the direction where the rotation axis Ax1 extends, with protrusions 40c, which come into contact with the support panel 32, thereby allowing the lamp unit 20A to be rotated in the vertical direction. The four protrusions 40c are formed such that one pair of protrusions 40c are respectively located in the vicinity of the opposite sides of each insertion hole 40a in the direction where the rotation axis Ax1 extends. The respective protrusions 40c have an approximately semi-spherical shape and are formed in the same size.

The support panel 32 is provided, at two positions in the direction where the rotation axis Ax1 extends, with boss portions 32a, into each of which the screw portion 50a of the screw 50 is screwed in order to fix the screw 50.

As illustrated in FIG. 4, a pin 32b is formed on the support panel 32 in the vicinity of the top of each boss portion 32a to protrude to the rear side. In addition, a through hole 40d, which has a slightly larger diameter than the pin 32b, is formed in the bracket 40 in the vicinity of the top of each insertion hole 40a. When the lamp unit 20A is assembled to the bracket 40, by inserting each pin 32b into one of the through holes 40d, the support panel 32 comes into contact with each protrusion 40c of the bracket 40 in a state where the support panel 32 is temporarily positioned in the vertical plane in relation to the bracket 40. Accordingly, the screw fastening operation of each screw 50 may be easily performed.

Meanwhile, as illustrated in FIGS. 2 and 3, an adjusting screw 54 configured to rotate the lamp unit 20A in relation to the bracket 40 in the vertical direction about the rotation axis Ax1 is located below the optical axis Ax (the position of the adjusting screw 54 which is designated by C in FIG. 1).

The base end of the adjusting screw 54 is rotatably supported on the bracket 40, and the tip end of the adjusting screw 54 is screw-coupled with the adjusting nut 56 mounted on the support panel 32.

In addition, the portion of the bracket 40 which supports the base end of the adjusting screw 54 is displaced to the rear side of the portion of the bracket 40 on which the sleeve 40b is formed. As illustrated in FIG. 5, the portion displaced to the rear side is formed with an insertion hole 40e to insert the adjusting screw 54 therethrough.

FIGS. 6A to 6D are views each illustrating a light distribution pattern formed by light irradiated from the vehicle lamp 10.

Figure 6A:
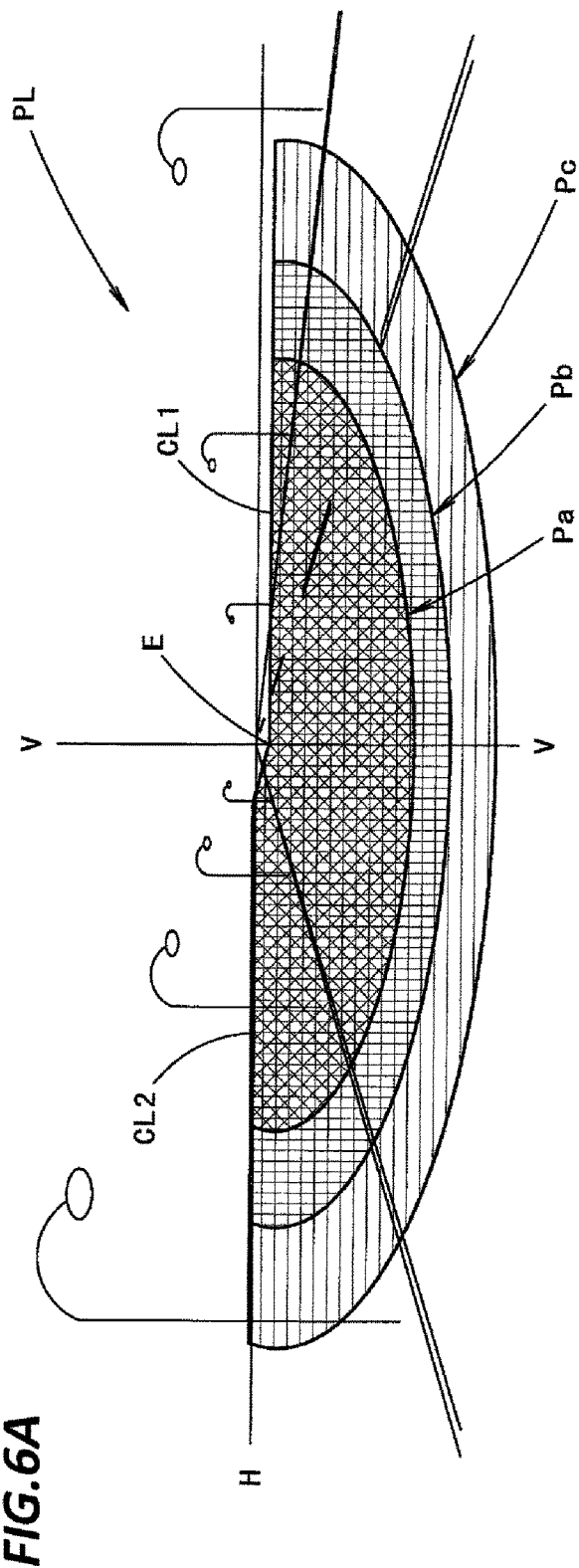
FIGS. 6A to 6D are views each illustrating a light distribution pattern formed by light emitted from the vehicle lamp.

FIG. 6A is a perspective view illustrating a low beam light distribution pattern PL formed on a virtual vertical screen that is located about 25 m ahead of the vehicle by light emitted from the vehicle lamp 10.

The low beam light distribution pattern PL is a low beam light distribution pattern for left-side light distribution, and has left and right uneven cutoff lines CL1 and CL2 on the upper-end edges thereof. The cutoff lines CL1 and CL2 horizontally extend with a stepped difference about the line V-V that vertically passes through a vanishing point H-V in the front direction of the lamp. The opposite lane side portion at the right side of the line V-V is formed as a lower end cutoff line CL1, and a vehicle lane side portion at the left side of the line V-V is formed as an upper end cutoff line CL2, which is upwardly stepped from the lower end cutoff line CL1 via a slope.

In the low beam light distribution pattern PL, an elbow point E, which is an intersection point of the lower end cutoff line CL1 and the line V-V, is located below the vanishing point H-V by about 0.5 to 0.6°.

Figure 6B:
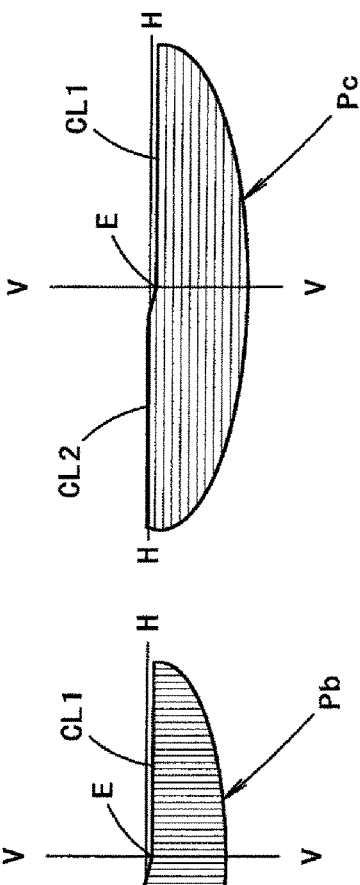
Figure 6C:
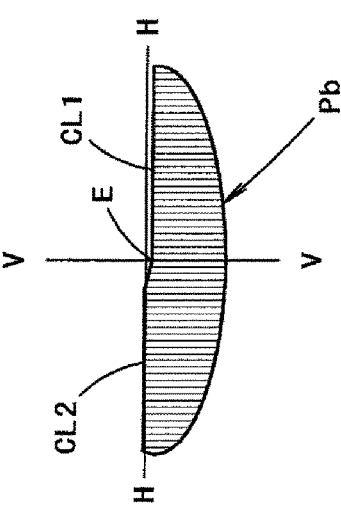
Figure 6D:
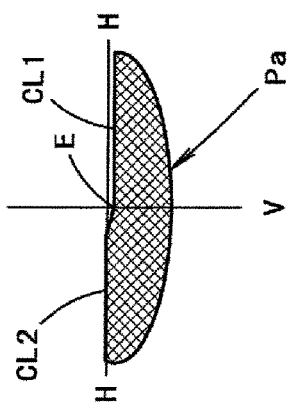

The low beam light distribution pattern PL is formed as a combined light distribution pattern in which three light distribution patterns Pa, Pb, and Pc, illustrated in FIGS. 6B, 6C, and 6D, overlap one another.

The light distribution pattern Pa is a light distribution pattern formed by light irradiated from the lamp unit 20A, the light distribution pattern Pb is formed by light irradiated from the lamp unit 20B, and the light distribution pattern Pc is formed by light irradiated from the lamp unit 20C.

The respective light distribution patterns Pa, Pb, and Pc are formed by projecting a light source image of the light emitting element 24, which is formed in a rear-side focal plane of the projection lens 22 by light irradiated from the light emitting element 24 and reflected by the reflector 26, on the virtual vertical screen as a reversed projection image by the projection lens 22. The cutoff lines CL1 and CL2 are formed as a reversed projection image of the front-end edge 30a1 of the upward reflecting surface 30a of the base member 30.

The light distribution pattern Pa is formed as a light distribution pattern that is smaller and brighter than the light distribution pattern Pb, and the light distribution pattern Pb is formed as a light distribution pattern that is smaller and brighter than the light distribution pattern Pc. Such a difference in the light distribution patterns is realized by differentiating the focal distance of the projection lens 22 or the shape of a reflecting surface of the reflector 26 among the respective lamp units 20A, 20B, and 20C.

Meanwhile, the three light distribution patterns Pa, Pb, and Pc are the same with regard to the shape of the cutoff lines CL1 and CL2. In addition, the three light distribution patterns Pa, Pb, and Pc coincide with the cutoff lines CL1 and CL2 of the low beam light distribution pattern PL with regard to the vertical positions of the cutoff lines CL1 and CL2 thereof. Accordingly, the cutoff lines CL1 and CL2 of the low beam light distribution pattern PL are clearly formed.

In order to realize this, the respective lamp units 20A, 20B, and 20C are appropriately rotated in the vertical direction about the rotation axis Ax1 thereof when they are assembled to the bracket 40.

In addition, when the bracket 40 is assembled to the lamp body 12 after the three lamp units 20A, 20B, and 20C are assembled to the bracket 40, the optical axes of the three lamp units 20A, 20B, and 20C are collectively adjusted by rotating the bracket 40 in relation to the lamp body 12 in the vertical direction and horizontal direction via appropriate adjustment of the two aiming screws 44.

Next, the acting effects of the present exemplary embodiment will be described.

Because the vehicle lamp 10 according to the present exemplary embodiment has a configuration in which each of the three lamp units 20A, 20B, and 20C, which are supported to be rotatable in relation to the bracket 40 as a support member in the vertical direction, is fastened to the bracket 40 at two positions in the vehicle width direction in which the rotation axis Ax1 extends, and because the bracket 40 is provided, at four positions in the direction where the rotation axis Ax1 extends, with the protrusions 40c for each lamp unit 20A, 20B, or 20C, which come into contact with the support panel 32 of each lamp unit 20A, 20B, or 20C, thereby allowing each lamp unit 20A, 20B, or 20C to be rotated in the vertical direction, the following acting effects may be acquired.

That is, by forming the protrusions 40c at four positions in the direction where the rotation axis Ax1 extends, despite a simplified configuration in which each lamp unit 20A, 20B, or 20C is fastened to the bracket 40 at two positions, contact portions of the four protrusions 40c may function as support points when each lamp unit 20A, 20B, or 20C is rotated, and accordingly, each lamp unit 20A, 20B, or 20C may be rotated in the vertical direction.

According to the present exemplary embodiment described above, in the vehicle lamp 10 including the bracket 40 for supporting the respective lamp units 20A, 20B, and 20C to be rotatable in the vertical direction, the respective lamp units 20A, 20B, and 20C may be rotated in the vertical direction with a simplified configuration. Accordingly, the cost of the lamp may be reduced.

At that time, in the present exemplary embodiment, because the bracket 40 is provided, at two positions in the direction where the rotation axis Ax1 extends, with the insertion holes 40a for each lamp unit 20A, 20B, or 20C, through which the screws 50 for screw fastening (i.e., fastening) are inserted, and because the protrusions 40c are formed respectively on opposite sides of each insertion hole 40a in the direction where the rotation axis Ax1 extends, a repulsive force generated upon fastening each screw 50 may be well balanced by the pair of protrusions 40c respectively located at the opposite sides of each insertion hole 40a.

In the present exemplary embodiment, because each protrusion 40c is formed in an approximately semispherical shape, contact portions of the two pairs of right and left protrusions 40c with each support panel 32 may function as fulcrums when each lamp unit 20A, 20B, or 20C is rotated, and each pair of protrusions 40c may have a sufficient repulsive force support function when the respective screws 50 are fastened.

In the present exemplary embodiment, each screw 50 is configured as a screw to which the washer 52 is mounted to be elastically deformable in the fastening direction of the screw 50. Thus, even if the positional relationship between each screw 50 and the support panel 32 of each lamp unit 20A, 20B, or 20C, which comes into contact with each protrusion 40c somewhat varies depending on the rotation of each lamp unit 20A, 20B, or 20C, the variation may be easily and stably absorbed by the elastic deformation of the washer 52. Accordingly, it is possible to prevent an excessive force from being applied to each lamp unit 20A, 20B, or 20C or the bracket 40.

At that time, in the present exemplary embodiment, because the washer 52 is configured as a wave washer, a variation in the positional relationship between the support panel 32 and each screw 50 may be stably absorbed.

In addition, in the present exemplary embodiment, because each screw 50 is configured as a stepped screw having a function of preventing separation of the washer 52, the screw fastening work can be easily performed.

In the present exemplary embodiment, because the bracket 40 is supported to be rotatable in relation to the lamp body 12, the adjustment of the optical axes of the three lamp units 20A, 20B, and 20C may be performed at the same time. Therefore, the vertical rotating amount required for each lamp unit 20A, 20B, or 20C may be suppressed to a relatively small value for correcting an optical axis deviation among the respective lamp units 20A, 20B, and 20C. Accordingly, the rotation of each lamp unit 20A, 20B, or 20C in the vertical direction can be performed more easily with a simplified configuration.

In addition, because the three lamp units 20A, 20B, and 20C are provided in the present embodiment, each lamp unit 20A, 20B, or 20C may be relatively light in weight. Accordingly, each lamp unit 20A, 20B, or 20C can be easily rotated in the vertical direction even with a simplified configuration, and thus, the cost of the lamp may be further reduced.

Although it has been described in the exemplary embodiment that the support panel 32 of each lamp unit 20A, 20B, or 20C is fastened to the bracket 40 via screw fastening, the support panel 32 may be configured to be fastened using other methods (e.g. press-fit or lance engagement).

Although it has been described in the present exemplary embodiment that the four protrusions 40c are formed on the bracket 40 per each lamp unit 20A, 20B, or 20C, the four protrusions 40c may be formed on the support panel 32 of each lamp unit 20A, 20B, or 20C.

Although it has been described in the exemplary embodiment that the vehicle lamp 10 includes the three lamp units 20A, 20B, and 20C, the vehicle lamp 10 may include two or less lamp units, or four or more lamp units.

Although it has been described in the exemplary embodiment that all the three lamp units 20A, 20B, and 20C are supported to be rotatable in the vertical direction in relation to the bracket 40, one of them may be fixed to the bracket 40, and the optical axes of the other two lamp units may be adjusted on the basis of the optical axis of the fixed lamp unit.

Although it has been described in the exemplary embodiment that all the three lamp units 20A, 20B, and 20C are configured to form the light distribution patterns Pa, Pb, and Pc, which have the same cutoff lines as the cutoff lines CL1 and CL2 of the low beam light distribution pattern PL, some or all of the three lamp units 20A, 20B, and 20C may be configured to form a light distribution pattern for a high beam, or a light distribution pattern for a fog lamp.

Although it has been described in the exemplary embodiment that each lamp unit 20A, 20B, or 20C is a projector type lamp unit having the reflector 26, for example, a protector type lamp unit or a parabolic type lamp unit may be employed that is not provided with the reflector 26.

Next, modifications of the exemplary embodiment will be described.

First, a first modification of the exemplary embodiment will be described.

Figure 7:
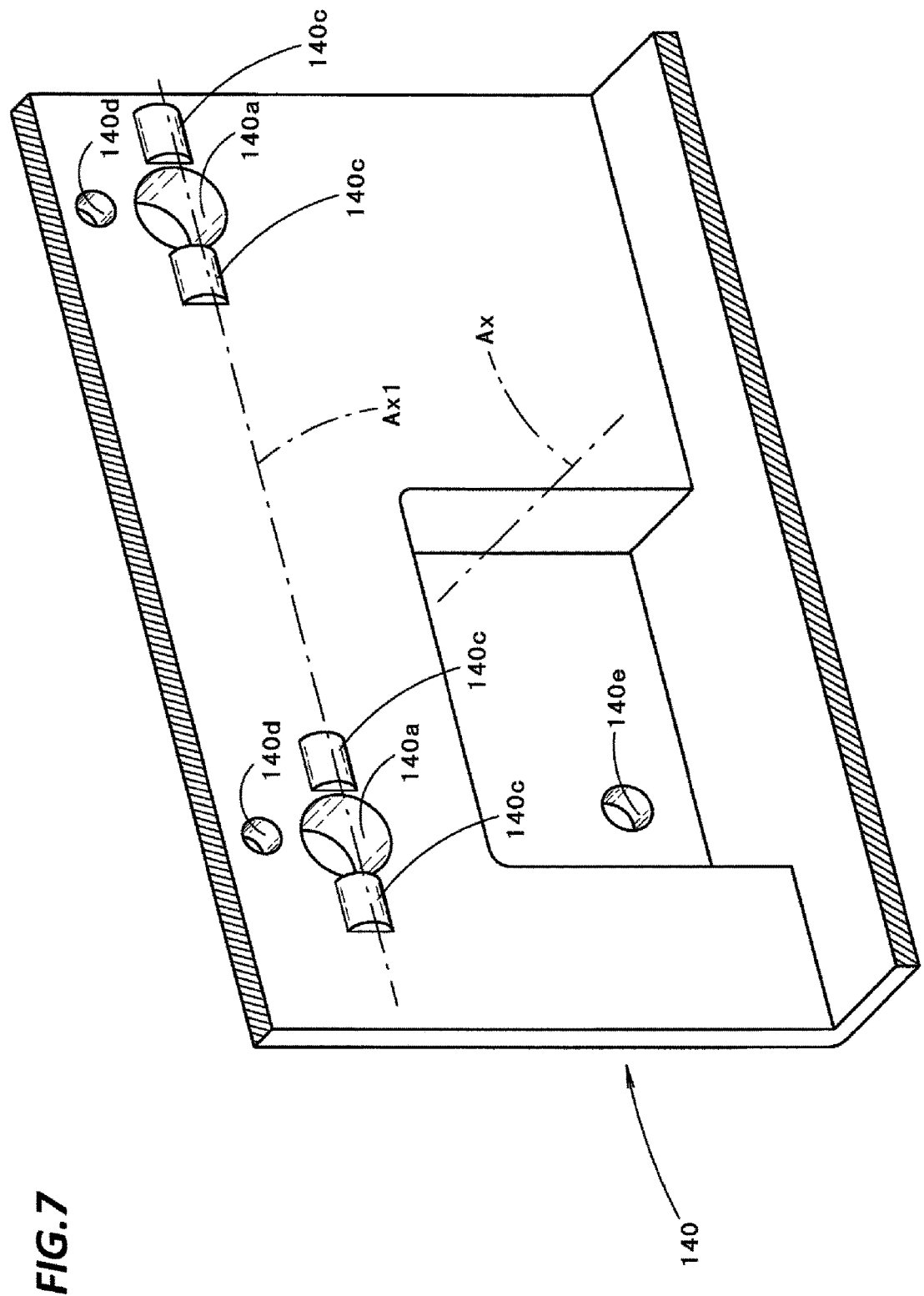
FIG. 7 is the same view as FIG. 5, illustrating a first modification of the exemplary embodiment.

FIG. 7 is the same view as FIG. 5, illustrating principal components of a bracket 140 of the vehicle lamp according to the present modification.

As illustrated in FIG. 7, the basic configuration of the bracket 140 of the present modification is the same as that of the exemplary embodiment. However, the shape of each protrusion 140c is different from that in the exemplary embodiment.

That is, in the present modification, each protrusion 140c is formed as a protrusion, which extends in the vehicle width direction in which the rotation axis Ax1 extends and has an approximately semi-cylindrical shape.

At that time, as in the exemplary embodiment, four protrusions 140c are formed in two pairs, each of which is formed in the vicinity of the opposite sides of each insertion hole 140a in the direction where the rotation axis Ax1 extends is the same as that.

In addition, as in the exemplary embodiment, in the present modification, a through hole 140d is also formed near the top of each insertion hole 140A, and an insertion hole 140e is formed in a portion displaced to the rear side in the bracket 140.

By forming each protrusion 140c in an approximately semi-cylindrical shape as in the present modification, it is possible to make the contact portions of the left and right two pairs of protrusions 140c with each support panel 32 function as fulcrums when each lamp unit 20A, 20B, or 20C is rotated, and to make each pair of protrusions 140c have a repulsive force support function more sufficiently when each screw 50 is fastened.

Next, a second modification of the exemplary embodiment will be described.

Figure 8:
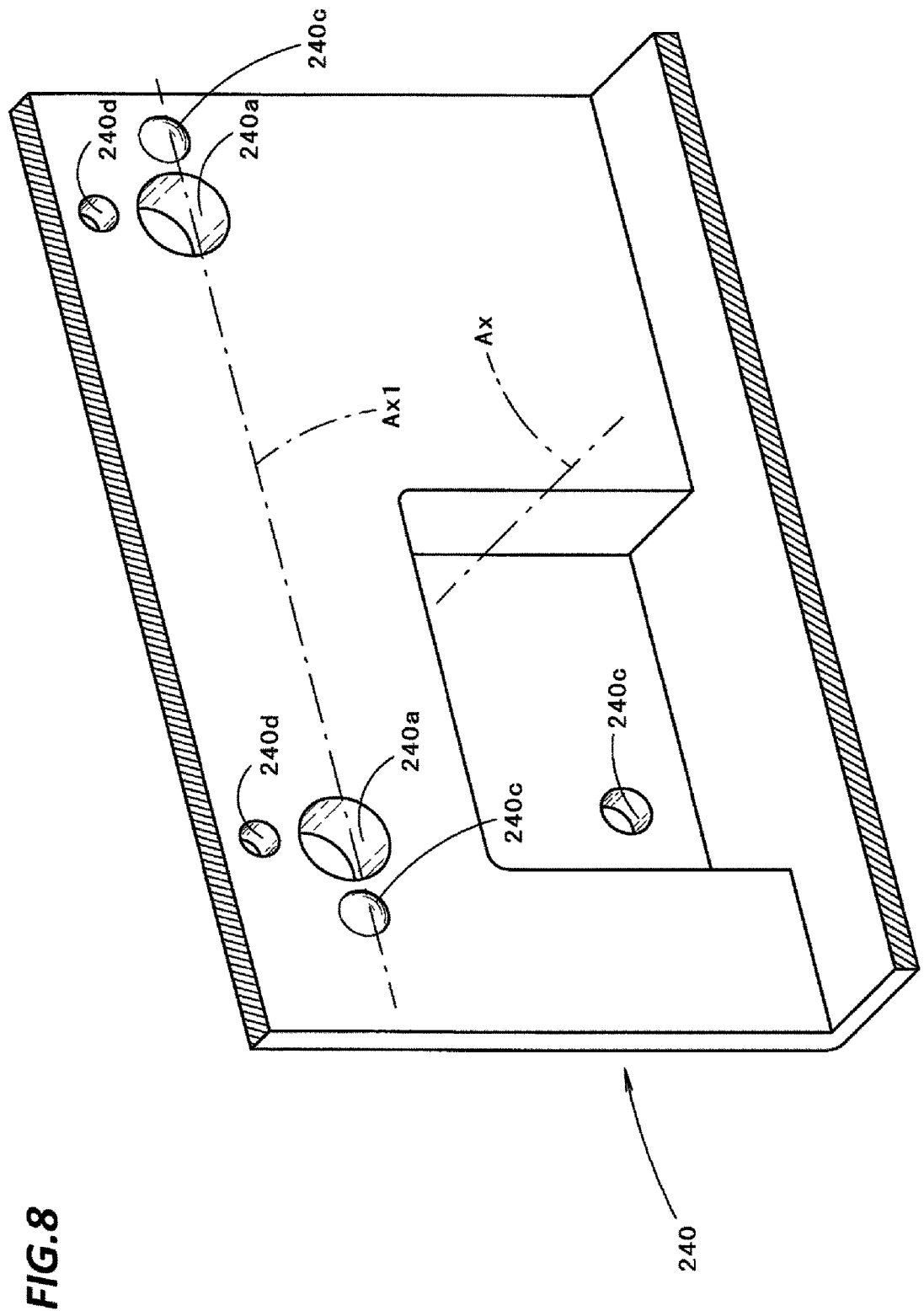
FIG. 8 is the same view as FIG. 5, illustrating a second modification of the exemplary embodiment.

FIG. 8 is the same view as FIG. 5, illustrating principal components of a bracket 240 of the vehicle lamp according to the present modification.

As illustrated in FIG. 8, the basic configuration of the bracket 240 of the present modification is the same as that of the exemplary embodiment. However, the present modification differs from the exemplary embodiment in that one protrusion 240c is formed for each insertion hole 240a.

At that time, with respect to a pair of left and right insertion holes 240a formed per each lamp unit 20A, 20B, or 20C, a pair of protrusions 240c are formed to be located near left and right sides of the insertion holes 240a, respectively.

In addition, as in the exemplary embodiment, in the present modification, a through hole 240d is also formed near the top of each insertion hole 240a, and an insertion hole 240e is also formed in a portion displaced to the rear side in the bracket 240.

Even in the case where one protrusion 240c is formed for each insertion hole 240a as in the present modification, the contact portions of the pair of left and right protrusions 140c with each support panel 32 may function as fulcrums when each lamp unit 20A, 20B, or 20C is rotated.

Next, a third modification of the exemplary embodiment will be described.

FIG. 9 is approximately the same view as FIG. 5, illustrating principal components of the vehicle lamp according to the present modification.

As illustrated in FIG. 9, the basic configuration of the present modification is the same as that of the exemplary embodiment. However, the present modification differs from the exemplary embodiment in terms of a configuration to rotate the lamp unit 20A in relation to a bracket 340 in the vertical direction about the rotation axis Ax1.

That is, in the present modification, a lance member 360, which extends rearward, is fixed to the rear surface of the support panel 32 of the lamp unit 20A, and the bracket 340 is provided with an engagement hole 340f that is engaged with the corresponding lance member 360 in the state where the lance member 360 is inserted through the engagement hole 340f.

The lance member 360 is fixed to the support panel 32 at the position where the adjusting nut 56 of the exemplary embodiment is mounted. The lance member 360 includes a planar base end 360A fixed to the support panel 32 and a planar main body 360B extending rearward from the base end 360A along a vertical plane. A multi-stepped lance portion 360a is formed on the top surface of the main body 360B. The multi-stepped lance portion 360a is formed by successively forming wedge-shaped ridges in the front-and-rear direction.

Meanwhile, the engagement hole 340f formed in the bracket 340 has a vertical width that is slightly wider than a vertical width of the main body 360B, and an engagement boss 340g is formed on the upper-end surface of the engagement hole 340f. The engagement boss 340g is formed in a wedge shape in a cross-section to protrude downward when viewed from a lateral side. In addition, the engagement boss 340g is engaged with the multi-stepped lance portion 360a of the lance member 360 in a state where the main body 360B of the lance member 360 is inserted through the engagement hole 340f of the bracket 340. At that time, by appropriately adjusting the engagement position of the engagement boss 340g and the multi-stepped lance portion 360a back and forth, the lamp unit 20A may be positioned in a state where it is rotated in the vertical direction in relation to the bracket 340 about the rotation axis Ax1.

By employing the configuration of the present modification, a simplified configuration in which the lance member 360 is only used instead of the adjusting screw 54 and the adjusting nut 56 of the exemplary embodiment may be achieved, and the cost may be correspondingly reduced.

Next, a fourth modification of the exemplary embodiment will be described.

FIG. 10 is the same view as FIG. 3, illustrating principal components of the vehicle lamp according to the present modification.

As illustrated in FIG. 10, the basic configuration of the present modification is the same as that of the exemplary embodiment. However, the present modification differs from the exemplary embodiment in terms of the support structure of a support panel 432 with respect to a bracket 440.

That is, in the present modification, the support panel 432 of the lamp unit 20A is fastened to the bracket 440 via screw fastening at one position on the rotation axis Ax1, which is located just above the optical axis Ax.

In this screw fastening, the screw 50, which is mounted with a washer 52 formed as a wave washer, is used as in the exemplary embodiment.

Even in the present modification, the bracket 440 is provided with a sleeve 440b having an insertion hole 440a, and the support panel 432 is provided with a boss portion 432a for fixing the screw 50.

In addition, the bracket 440 is provided, at two positions in the vehicle width direction in which the rotation axis Ax1 extends, with protrusions 440c, which come into contact with the support panel 432, thereby allowing the lamp unit 20A to be rotated in the vertical direction. The two protrusions 440c are arranged in a horizontally symmetrical positional relationship at the opposite sides of the insertion hole 440a in the direction where the rotation axis Ax1 extends. The respective protrusions 440c are formed in an approximately semi-spherical shape and in the same size.

In addition, even in the present modification, the adjusting screw 54 and the adjusting nut 56, which serve to rotate the lamp unit 20A in relation to the bracket 440 in the vertical direction about the rotation axis Ax1, are located below the optical axis Ax.

Even in the case where the configuration of the present modification is employed, the contact portions of the two protrusions 440c may function as fulcrums when the lamp unit 20A is rotated, and thus, the lamp unit 20A may be rotated in the vertical direction.

Moreover, in the present modification, the acting effects described above may be acquired by a very simplified configuration in which the lamp unit 20A is fastened to the bracket 440 at one position in the direction where the rotation axis Ax1 extends.

In addition, numerical values described as specifications in the exemplary embodiment and the modifications thereof are merely given by way of example, and these numerical values may of course be set to appropriate different values.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
    a lamp unit; and
    a support member configured to support the lamp unit to be rotatable in a required direction,
    at least one fastener configured to fasten the lamp unit to the support member at least one axial position along a rotation axis, wherein the lamp unit is rotated in the required direction relative to the rotation axis, and
    one of the lamp unit and the support member includes a planar surface and protrusions that are formed on the planar surface at least two axial positions along the rotation axis, and configured to allow the lamp unit to be rotated in the required direction by being in contact with a remaining one of the lamp unit and the support member.

2. The vehicle lamp of claim 1, wherein the one of the lamp unit and the support member includes an insertion hole that is formed at least one axial position along the rotation axis, so as to insert the fastener therethrough, and
    the protrusions are respectively formed at opposite sides of each insertion hole along the rotation axis.

3. The vehicle lamp of claim 2, wherein each of the protrusions is formed as a substantially semi-spherical protrusion or a substantially semi-cylindrical protrusion along the rotation axis.

4. The vehicle lamp of claim 3, wherein the fastener is configured as a screw on which a washer is mounted, and the washer is configured to be elastically deformable in a direction where the fastener is fastened.

5. The vehicle lamp of claim 2, wherein the fastener is configured as a screw on which a washer is mounted, and the washer is configured to be elastically deformable in a direction where the fastener is fastened.

6. The vehicle lamp of claim 1, wherein each of the protrusions is formed as a substantially semi-spherical protrusion or a substantially semi-cylindrical protrusion along the rotation axis.

7. The vehicle lamp of claim 6, wherein the fastener is configured as a screw on which a washer is mounted, and the washer is configured to be elastically deformable in a direction where the fastener is fastened.

8. The vehicle lamp of claim 1, wherein the fastener is configured as a screw on which a washer is mounted, and the washer is configured to be elastically deformable in a direction where the fastener is fastened.

9. The vehicle lamp of claim 1, wherein the support member is configured as a bracket and is supported to be pivotally rotatable in relation to a lamp body, and a plurality of lamp units is supported on the bracket.

* * * * *